United States Patent [19]

Tomforde

[11] Patent Number: 4,968,083
[45] Date of Patent: Nov. 6, 1990

[54] FRONT WALL COLUMN OF A MOTOR VEHICLE

[75] Inventor: Johann Tomforde, Sindelfingen, Fed. Rep. of Germany

[73] Assignee: Daimler-Benz Aktiengesellschaft, Fed. Rep. of Germany

[21] Appl. No.: 211,458

[22] Filed: Jun. 24, 1988

[30] Foreign Application Priority Data

Jun. 25, 1987 [DE] Fed. Rep. of Germany ....... 3720960

[51] Int. Cl.$^5$ ................................................ B60J 1/20
[52] U.S. Cl. .................................. 296/180.1; 296/208; 296/213
[58] Field of Search ...................... 296/180.1, 154, 208, 296/213

[56] References Cited

U.S. PATENT DOCUMENTS

| | | |
|---|---|---|
| 3,583,757 | 6/1971 | Wilfert et al. ................. 296/154 X |
| 3,666,316 | 5/1972 | Wilfert ............................ 296/213 X |
| 4,088,366 | 5/1978 | Gallitzendorfer et al. ......... 296/154 |
| 4,518,197 | 5/1985 | Gallitzendorfer et al. ......... 296/213 |
| 4,541,664 | 9/1985 | Gallitzendorfer et al. ......... 296/213 |
| 4,722,066 | 9/1988 | Leschke et al. .................... 296/208 |

FOREIGN PATENT DOCUMENTS 3017732 11/1981 Fed. Rep. of Germany ...... 296/208
3119358 12/1982 Fed. Rep. of Germany ...... 296/208

*Primary Examiner*—Dennis H. Pedder
*Attorney, Agent, or Firm*—Evenson, Wands, Edwards, Lenahan & McKeown

[57] ABSTRACT

In a front wall column of a motor vehicle with a front wall column cover which, together with the windshield forms a water-collecting channel for draining flowing-off water in that it is arranged at a distance to the windshield and protrudes over the front wall column in the direction of the windshield, whereby the water-collecting channel is provided with an insert profile, the air resistance coefficient is reduced, the water drainage from the windshield is improved and an accident reduction is achieved in that the water-collecting channel includes a flow channel facing the front wall column cover and conducting away the water and a deflection profile facing the windshield and guiding the water flowing off laterally from the windshield into the flow channel, and in that the front wall column cover is supported at the insert profile. The flow channel has a substantially constant width whereas the deflection profile is constructed conically and at the roof of the vehicle terminates tangentially to the roof paneling.

26 Claims, 4 Drawing Sheets

FRONT WALL COLUMN OF A MOTOR VEHICLE

BACKGROUND AND SUMMARY OF THE INVENTION

The present invention relates to a front wall column of a motor vehicle with a front wall column cover which together with the windshield of the motor vehicle forms a water-collecting channel for draining water flowing off laterally from the windshield in that it is arranged at a distance to the windshield and protrudes over the front wall column in the direction of the windshield whereby the water-collecting channel is provided with an insert profile.

It is known to provide laterally at the windshield of a motor vehicle water-collecting channels, by means of which the water flowing off laterally from the windshield is caught (DE-OS 31 21 093). It is to be prevented thereby that the side windows are soiled by the flowing-off water which, for examPle, renders more difficult the view of the side mirror. However, these water-collecting channels influence unfavorably the air resistance coefficient of the vehicle which becomes disadvantageous as regards the fuel consumption especially at high driving velocities and additionally leads to disturbing wind noises. It has been attempted to eliminate this disadvantage in that a filler body is inserted into the water-collecting channel which in dry weather completely fills out the channel and in case of rain forms itself a channel. For that purpose, the filler body is constructed as inflatable hose which in the inflated condition fills out the water-collecting channel, and itself forms a channel when the air is let out. The inflation of the hose and the discharge of the air, however, has proved difficult because during the cold season of the year the danger of icing-up and freezing-up exists and the hose becomes brittle and breaks easily which leads to functioning interferences and also to non-tightnesses.

Additionally, equipping a vehicle with such a hose is very complicated and cost-intensive.

The present invention is therefore concerned with the task to so construct a front wall column that it has a low air resistance coefficient, that the water flowing off laterally from the windshield is drained off safely and that the front wall column contributes to the accident prevention, respectively, reduction.

The underlying problems are solved according to the present invention in that the water-collecting channel includes a flow channel facing the front wall column cover and draining off the water and a deflection profile facing the windshield and guiding the water laterally flowing off from the windshield into the flow channel, and in that the front wall column cover is supported at the insert profile.

The water-collecting channel formed by the front wall column, the front wall column cover and the windshield includes a flow channel and a deflection profile. The deflection profile guides the water laterally flowing off from the windshield into the flow channel in which it is conducted away from the area of the windshield to the roof of the vehicle. This flow channel possesses a considerably smaller cross section compared to the water-collecting channel so that the deflection profile has a relatively large width in comparison therewith. This offers the significant advantage that the air together with the water laterally flowing off from the windshield is so deflected that it sweeps over the flow channel and a turbulence of the water present in the flow channel is avoided thereby. Additionally, a relatively wide deflection Profile brakes the water flowing off from the windshield so strongly that it flows quieted into the flow channel and can be conducted away within the same. Furthermore, the relatively small cross section of the flow channel and the large width of the deflection profile, as a result of which the air is deflected without vortex formation and the water is braked, offers the advantage that the air resistance coefficient and the noise formation is considerably reduced compared to prior art water-collecting channels with large cross section.

A lessening of traffic accidents, respectively, a reduction of injuries is achieved by the support of the front wall column cover at the insert profile. As the cover which forms a part of the water-collecting channel, slightly yields in case of an impact conditioned on a traffic accident, the extent of injuries can be considerably reduced because the rigid front wall column is now provided with a recoiling cover part.

Advantageously, the flow channel and the deflection profile are formed by the insert profile so that both the flow channel as also the deflection profile can be matched also to different vehicle types by means of differently dimensioned insert profiles.

A further reduction of the air resistance coefficient is achieved in that the flow channel has an essentially constant width from the lower to the upper end of the water-collecting channel and is located in the effective outer zone of the water-collecting channel because the occurring water arrives thereat braked already by way of the deflection profile, and therefore a turbulence of the water as also a vortex formation of the air flowing off from the windshield are avoided. The cross section of the water-collecting channel which as a rule decreases from the lower to the upper end of the front wall column, and which causes large swirl losses, is now filled out except for the width of the flow channel by the deflection profile conically tapering from the lower to the upper end of the front column so that the losses are limited to a minimum. For achieving optical effects, the flow channel may also be so constructed that the same also tapers slightly in the upward direction. Advantageously, the flow channel is provided throughout with a width of 6 mm. and with a constant depth that is so dimensioned that the water arriving from the windshield is completely drained off.

A reduction of the flow resistance both of the air as also of the water is additionally favored in that the free surface of the deflection profile passes over aerodynamically from the outer surface of the windshield into the flow channel. The air arriving from the windshield is thereby gradually deflected and guided over the front wall column without the formation of vortices or swirls within the area of the flow channel which under certain circumstances tear the flowing-off water out of the flow channel.

The drainage of the water in the flow channel is favored according to the present invention in that the flow channel is extended without height offset over the windshield frame at the upper edge of the windshield up to the roof paneling of the vehicle. The deflection profile thereby passes over tangentially into the roof paneling over the windshield frame. The water can flow off unobstructedly onto the roof without causing a damming up at the upper end of the flow channel which Possibly might cause a return flow of the water to the windshield.

An easy and cost-favorable assembly is attained according to this invention in that the insert profile is made from an elastic material, preferably rubber or EPDM. The use of an elastic material additionally entails the advantage that slight dimensional deviations of the water-collecting channel can be compensated for without any problems.

A preferred embodiment in accordance with the present invention provides that the insert profile consists within the area of the flow channel of a hard-elastic material and within the area of the deflection profile of a soft elastic material. The use of a soft elastic material for the deflection profile offers the advantage that a good sealability and close adaptability to the windshield are attainable. Additionally, the support force of the front wall column cover can be determined by a suitable selection of the rigidity of the two materials. With a two-partite construction, the deflection profile is advantageously vulcanized to the flow channel.

According to a further embodiment of the present invention, the insert profile is constructed as hollow profile. This further contributes to the fact that in case of an accident-conditioned impact the recoiling front wall column cover abuts springily at the insert profile, as a result of which the insert profile is also compressed, and thus also contributes to the accident reduction. The yielding fixation of the front wall column cover is achieved in that it is pivotally fixed with its one longitudinal edge at the front wall column and is elastically supported at the insert profile with its other longitudinal edge. As a result thereof, the longitudinal edge pointing forwardly in the driving direction of the vehicle becomes pivotal and in case of an impact is yieldingly retained at the front wall column.

Another embodiment according to the present invention provides that the front wall column cover is jointedly fixed at the front wall column with its one longitudinal edge and is elastically supported at a retaining strip secured at the front wall column by way of a rib provided within the area of its other longitudinal edge. The jointed fixing may take place, for example, by way of a clamp connection, welded connection, riveted connection or the like. The construction of the insert profile from an elastic material enables the recoiling of the front wall column cover in that it pivots about its longitudinal edge fixed at the front wall column and deforms the insert profile.

In order to be able to keep away from the side windows also the water impinging on the front wall column cover, the longitudinal edge of the front wall column cover facing the side window is provided with a further water-collecting channel. The water which laterally flows off from the front wall column cover is collected in this further water-collecting channel and drained off therein.

BRIEF DESCRIPTION OF THE DRAWINGS

These and further objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
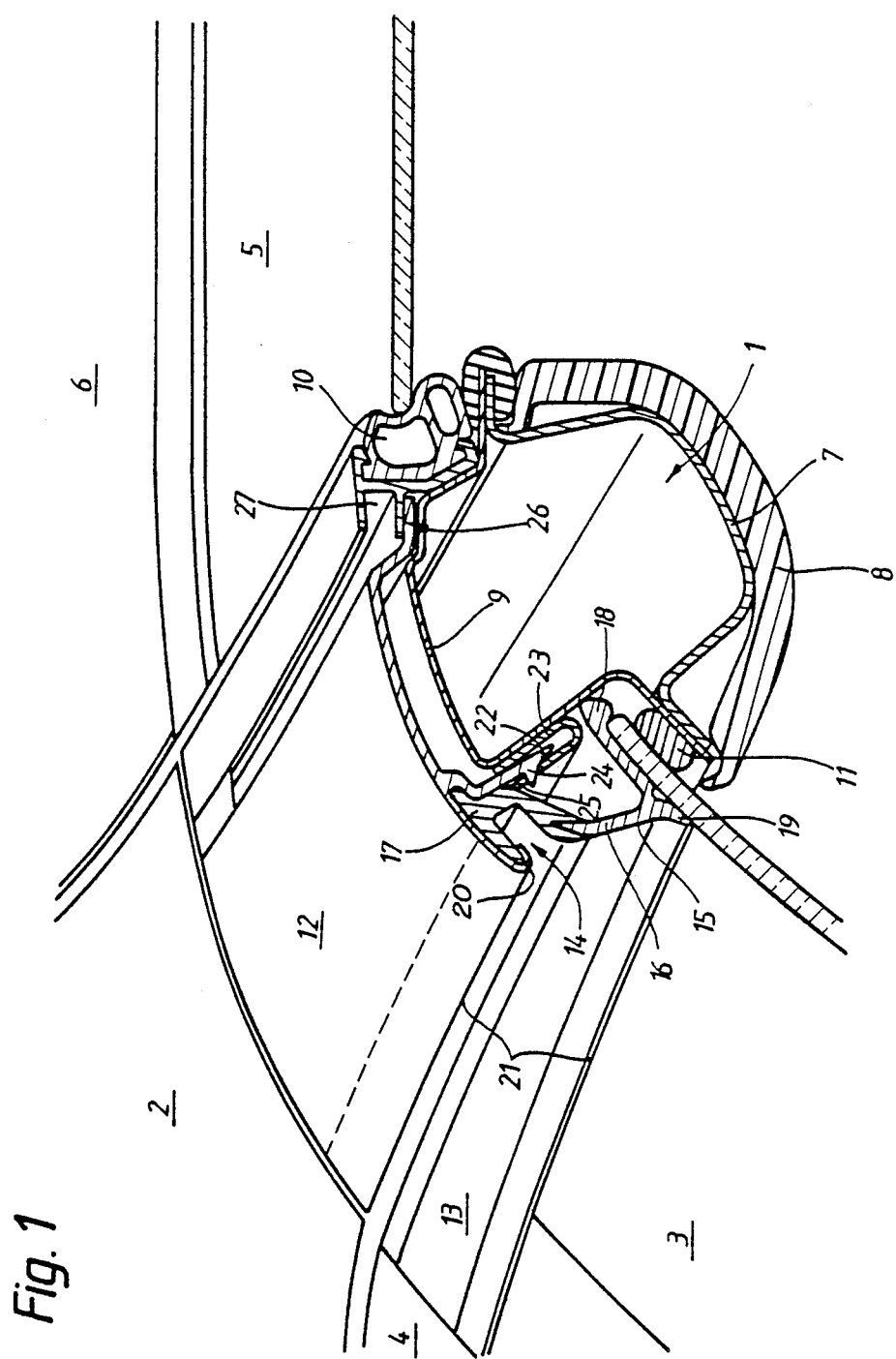
FIG. 1 is a perspective view of a front wall column, cut transversely, with a two-partite insert profile in accordance with the present invention.
Figure 2:
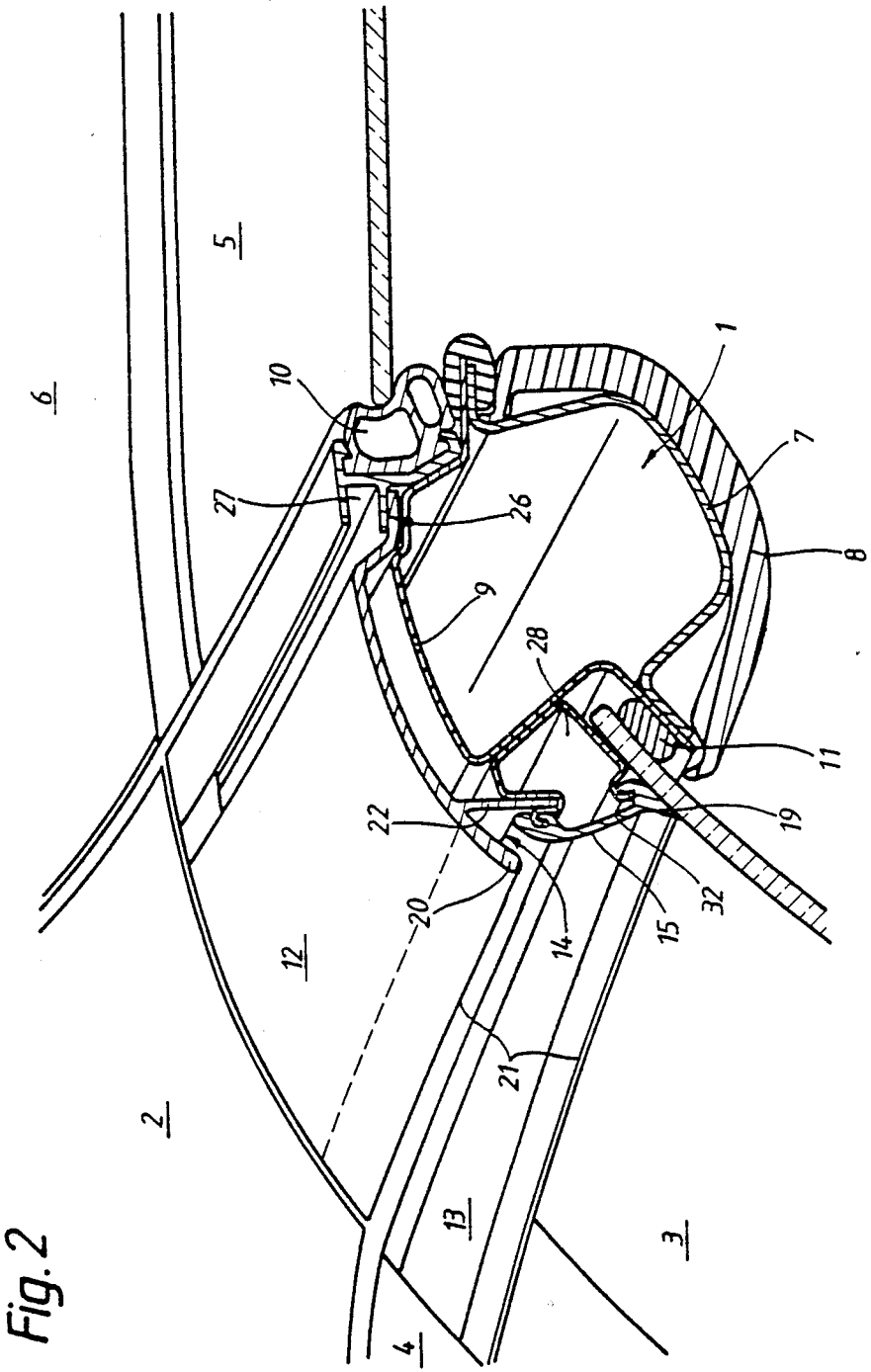
FIG. 2 is a perspective view, similar to FIG. 1, of a modified embodiment of a front wall column in accordance with the present invention.
Figure 3:
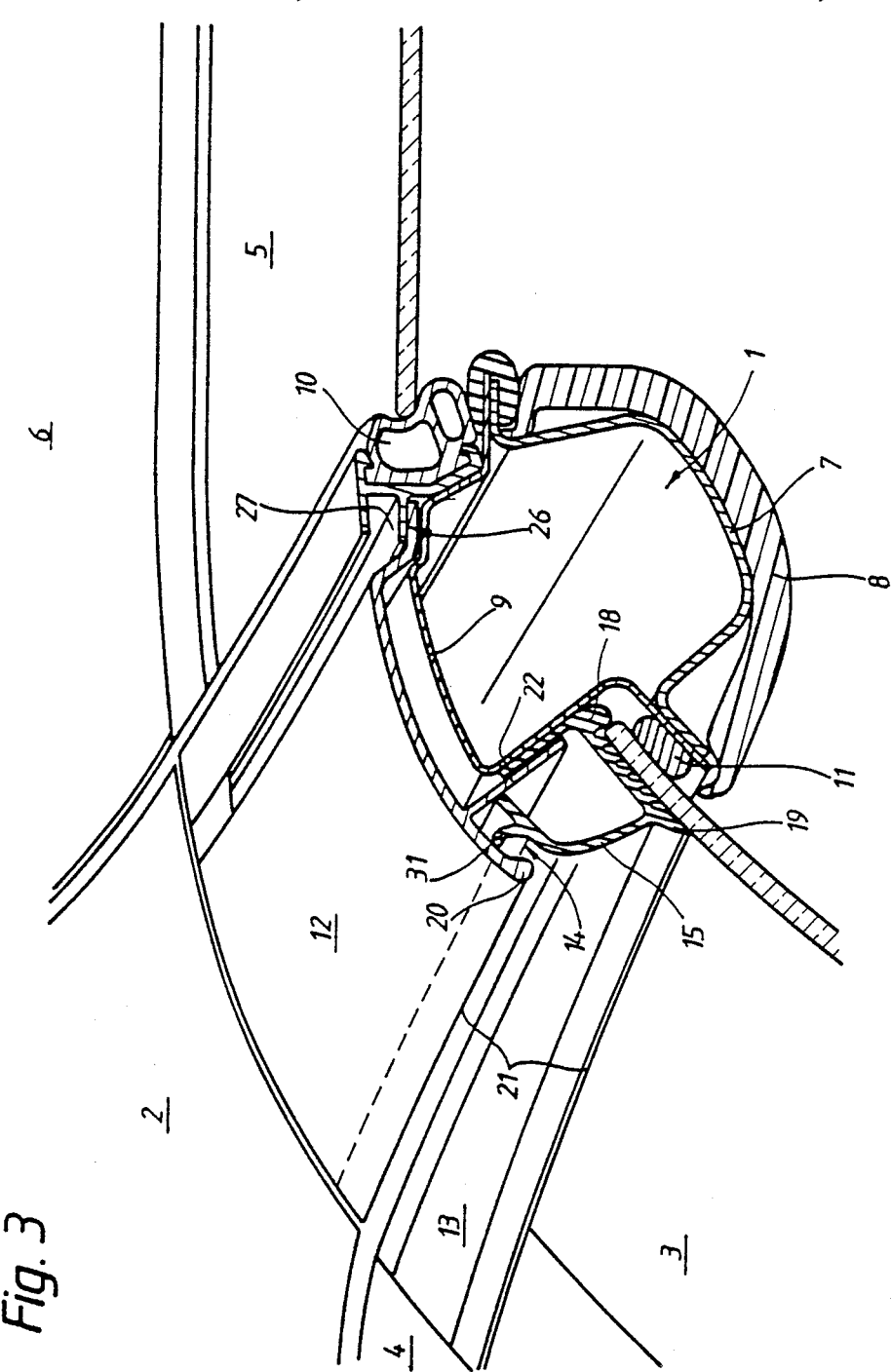
FIG. 3 is a perspective view, similar to FIG. 1, of a still further modified embodiment of a front wall column with an open hollow profile as insert profile in accordance with the present invention.

Referring now to the drawing wherein like reference numerals are used throughout the various views to designate like parts. FIGS. 1 to 3 illustrate a perspective view of the front wall column generally designated by reference numeral 1, whereby the viewing direction takes place from the roof (not shown) of the motor vehicle downwardly toward the front fender 2. The windshield arranged to the rear of the engine hood 4 is designated by reference numeral 3. In addition to the front wall column 1, the side window 5 of the side door 6 is also shown in these figures.

The front wall column 1 essentially consists of an inner shell 7 which is provided with a padding 8, and of an outer shell 9. The two shells 7 and 9 are connected with each other in a torsionally resistant manner, for example, by way of spot-welding. The outer shell 9 carries, inter alia, the seal 10 for the side window 5 and the seal 11 for the windshield 3 whereby the seal 11 may also be constructed as adhesive mass for fixing the windshield 3. Additionally, a front wall column cover 12, which extends over the shell 9, extends essentially from the seal 10 up to over the edge of the windshield 3. The water-collecting channel 21 resulting between the front wall column cover 12 and the windshield 3 is provided with an insert profile 13 by means of which a flow channel 14 and a deflection profile 15 are formed.

The flow channel 14 preferably has an essentially constant depth as illustrated by the dashed lines of FIGS. 1, 2 and 3, and preferably a width of about 4 to 8 mm, about 6 mm being considered sufficient.

The insert profile 13 of FIG. 1 is made of two elements 16 and 17 whereby the element 16 forms the deflection profile 15 and the element 17 the flow channel 14. Advantageously, the elements 16 and 17 are made of an elastic material, for example, of rubber or EPDM, which favors a yielding of the front wall column cover 12 in case of an impact, as will be discussed more fully hereinafter. The elasticity of the insert profile 13 can be varied within a wide range in that the two elements 16 and 17 consist of materials with different Shore hardnesses. Preferably the material of the first element 16 is an elastic plastic material that is softer than the elastic plastic material of the second element 17. The elements 16 and 17 can be connected with each other, for example, can be vulcanized one to the other within the transition area from the deflection profile 15 to the flow channel 14.

A fixed position of the insert profile 13 in the water-collecting channel 21 is achieved in that the first element 16 includes a nose portion 18 engaging from behind the edge of the windshield 3, is sealingly supported on the windshield 3 by way of a lip 19 and is fixed at the front wall column cover 12 by way of the element 17. For that purpose, the edge 20 of the front wall column cover 12 facing the windshield 3 is drawn-in and surrounds the free end of the second element 17 constructed essentially U-shaped. The other end of this leg includes a nose portion which is fixedly seated in a groove of the front wall column cover 12. This groove is formed by a rib 22 arranged angularly at the front wall column cover 12 which serves for fixing the cover 12 at the front wall column 1. The rib 22 thereby engages into a U-shaped retaining strip 23 fixed at the front wall column 1, in which it is movably guided. Advantageously, the retaining strip 23 acts in conjunction with the rib 22 as spring element because the rib 22 forces apart the legs by means of a laterally provided nose portion 24 when penetrating between the two legs of the retaining strip 23, as a result of which a return moment is produced. Additionally, an opening 25 may be provided at the free end of the leg facing the nose portion 24, into which the nose portion 24 engages in the rest or normal position of the cover 12 and owing to which an unauthorized removal of the cover 12 is prevented. During the pivoting of the cover 12 on the insert profile 13, i.e., when inserting the rib 22 into the retaining strip 23, the nose portion 24 leaves the opening 25 and thereby effects a forcing-apart of the legs of the strip 23.

The construction of the insert profile 13 and of the front wall column cover 12 enables, on the one hand, the drainage of the water laterally flowing off from the windshield without any problem and, on the other, the reduction of the injury danger in case of an impact on the front wall column 1 conditioned on an accident. The water arriving from the windshield 3 flows over the lip 19 onto the deflection profile 15 of the element 16 and is thereby strongly braked so that it flows into the flow channel 14 quieted and with low velocity, where it flows off along the channel 14 in the direction toward the vehicle roof. The deflection profile 15 additionally brings about that the impinging air is so strongly deflected that it sweeps over the channel 14 and as a result thereof turbulences of the water in the channel 14 and a blowing out of the water out of the channel 14 are avoided.

Both the air resistance coefficient as also wind noises are considerably reduced thereby.

The lessening of an accident-conditioned impact is achieved in that the front wall column cover 12 is pivotally supported about its one longitudinal edge 26 and as a result thereof its other longitudinal edge 20 is elastically yielding essentially opposite the driving direction of the vehicle. This additionally entails the advantage that an impact with low energy is absorbed without permanent deformation.

Furthermore, a second water-collecting channel 27 is provided in FIG. 1 within the area of the longitudinal edge 26 of the front wall column cover 12, by means of which water impinging on the cover 12 is caught, and a soiling of the side window 5 is avoided. This water-collecting channel 27 can be constructed as separate component or can be formed-on in one piece at the cover 12 and may serve for fixing the seal 10.

FIG. 2 illustrates another embodiment of the insert profile 13 in accordance with the present invention which, in this case, consists as two-partite element with a retaining profile 28 and a plug-in mounting member 32. The retaining profile 28 is rigidly connected with the outer shell 9 of the front wall column 1 and carries the plug-in member 32, for example, by way of a plug-/snap-in connection, which forms the deflection profile 15. The one lonqitudinal edqe of the deflection profile 15 abuts with the lip 19 at the windshield 3 and the other longitudinal edge forms by means of the rib 22 and the front wall column cover 12 the flow channel 14. The retaining profile 28 is also so constructed that it permits an entry of the rib 22 into the insert profile 13 and therewith a yielding or recoiling of the cover 12. The longitudinal edge 6 of the cover 12 is constructed as water-collecting channel 7 and is connected with the front wall column 1, for example, by way of spot-welding.

The embodiment illustrated in FIG. 3 includes an insert profile 13 made of an open hollow profile. The rib 22 of the front wall column cover 12 engages into this open hollow profile and is supported, for example, by way of a riveted, threaded, welded or adhesive connection. The flow channel 14 is delimited at approximately half of its depth by a lip 31 protruding from the insert profile 13 which abuts at the inner side of the front wall column cover 12. In case of an accident-conditioned impact on the front wall column cover 12, the rib 22 recoils and deforms the insert profile 13 which advantageously consists of a rubber-elastic material.

Figure 4:
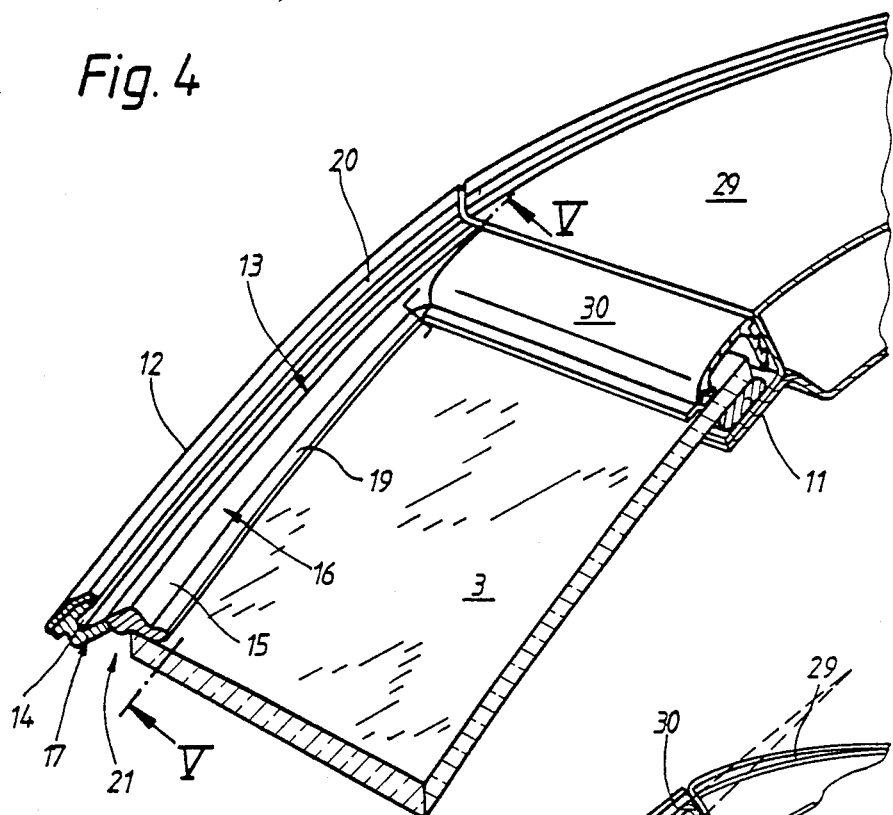
FIG. 4 is a perspective view on the upper corner area of the windshield frame illustrating the transition of the front wall column cover, flow channel and deflection profile to the vehicle roof in accordance with the present invention.

In the perspective view of an upper corner of the windshield 3 shown in FIG. 4, the transition of the flow channel 14 to the roof paneling 29 of the vehicle can be seen. The construction of the water-collecting channel 21 corresponds to that of FIG. 1, where the deflection profile 15 is formed by a first element 16 and the flow channel 14 is formed by a second element 17 of the insert profile 13. At the transition from the windshield 3 to the roof paneling 29, the deflection profile 15 is so shaped that it adapts itself accurately to the profile of the windshield frame 30 and terminates tangentially in the roof paneling 29. This offers the considerable advantage that the flow channel 14 passes over into the vehicle roof without height offset and, as a result thereof, the water flowing off in the channel can flow off unobstructedly onto the roof paneling 29.

Figure 5:
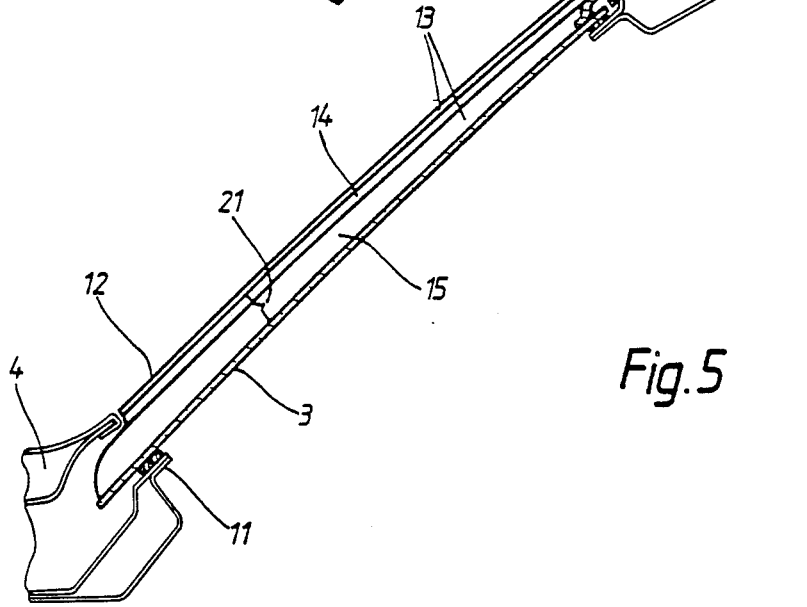
FIG. 5 is a cross-sectional view taken along line V—V of FIG. 4.

The cross section V—V shown in FIG. 4 is illustrated in FIG. 5 where the water-collecting channel 21 can be seen in its full length. At the lower end, the engine hood is indicated by reference numeral 4 and at the upper end the roof paneling is indicated by reference numeral 29. The engine hood 4 partially overlaps the lower end of the windshield 3 whereby a relatively wide free space, the wiper well, for the windshield wipers (not shown) disposed in the rest position is formed. This wiper well requires a relatively large distance of the front wall column cover 12 to the windshield 3 so that in the lower area the water-collecting channel 21 has a large width of about 50 to 60 mm. At the upper end, the front wall column cover 12 passes over into the roof paneling 29 and only has a small distance to the windshield 3. This spacing reduction of the front wall column cover 12 to the windshield 3, respectively, the reduction of the width of the water-collecting channel 21 along the side edge of the windshield 3 is compensated in that the deflection profile 15 is constructed conically tapering as shown by the dashed lines of FIG. 4. Advantageously, the flow channel 14 which is shown in dash line, has an essentially constant width of about 5 to 6 mm. and is located in the area of the water-collecting channel 21 facing the front wall column cover 12. At the upper end of the water-collecting channel 21, the stepless transition of the flow channel 14 into the roof paneling 29 can be seen in this figure, as a result of which the water is drained off without obstruction and interference.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A front wall column construction of a motor vehicle, comprising:
   a front wall column adjacent a windshield of the vehicle,
   a front wall column cover covering an outside of the front wall column and secured to the same,
   a water collecting channel extending between the windshield and the front wall column cover,
   an insert profile forming at least a portion of the water collecting channel, the insert profile being constructed as a seal between the front wall column cover and the windshield, the insert profile having a flow channel and a deflection profile,
   wherein the flow channel is intermediate an upper end of the deflection profile and the front wall column cover adjacent the front wall column and drains water from the water collecting channel, the flow channel having a cross-section smaller than a cross-section of the water collecting channel, and
   wherein the deflection profile abuts at the windshield and guides water flowing laterally off from the windshield into the flow channel and deflects air flow over the flow channel to avoid water from being blown out of the flow channel.

2. A front wall column construction according to claim 1, wherein the flow channel and the deflection profile are formed by the insert profile.

3. A front wall column construction according to claim 2, wherein the flow channel has an essentially constant width from a lower to an upper end of the water collecting channel.

4. A front wall column construction according to claim 3, wherein the flow channel has a width of about 4 to about 8 mm.

5. A front wall column construction according to claim 4, wherein the flow channel has a width of about 6 mm.

6. A front wall channel construction according to claim 4, wherein the flow channel has an essentially constant depth.

7. A front wall column construction of a motor vehicle, comprising:
   front wall column means adjacent a windshield of the vehicle,
   front wall column cover means covering an outside of the front wall column and secured to the same,
   a water collecting channel means extending between the windshield and the front wall column cover means, said water collecting channel means including a flow channel means having essentially a constant width of about 4 to about 8 mm and essentially a constant depth, the flow channel means being adjacent the front wall column means for draining water from the water collecting channel means, the flow channel means having a cross-section smaller than a cross-section of the water collecting channel means, the water collecting channel means further including a deflection profile means abutting at the windshield for guiding water flowing laterally off from the windshield into the flow channel means and for deflecting air flow over the flow channel means to avoid water from being blown out of the flow channel means, wherein the deflection profile means tapers conically from the lower to the upper end of the water collecting channel means, and
   an insert profile means forming the eater collecting channel means, the flow channel means and the deflection profile means, the insert profile means being constructed as a seal and abutting at the front wall column cover means.

8. A front wall column construction according to claim 7, wherein the flow channel means extends above a windshield frame at an upper edge of the windshield to a roof paneling means of the vehicle.

9. A front wall column construction according to claim 8, wherein the insert profile means is made of an elastic material.

10. A front wall column construction according to claim 9, wherein said elastic material is made of one of rubber and EPDM.

11. A front wall column construction according to claim 9, wherein the insert profile means is made of a harder elastic material within an area of the flow channel means than an elastic material within the area of the deflection profile means.

12. A front wall column construction according to claim 9, wherein the deflection profile means is vulcanized to the flow channel means.

13. A front wall column construction according to claim 9, wherein the front wall column cover means is jointedly fixed at the front wall column means along its one longitudinal edge and is yieldingly supported at the insert profile means with its other longitudinal edge.

14. A front wall column construction according to claim 9, wherein the front wall column cover means is jointedly fixed at the front wall column means with its one longitudinal edge and is elastically supported at a retaining strip means secured at the front wall column means within the area of its other longitudinal edge.

15. A front wall column construction according to claim 9, wherein a further water collecting channel means is provided within the area of the longitudinal edge of the front wall column cover means facing the side window.

16. A front wall column construction according to claim 1, wherein the flow channel has an essentially constant width from a lower to an upper end of the water collecting channel.

17. A front wall column construction according to claim 16, wherein the flow channel has a width of about 4 to about 8 mm.

18. A front wall column construction according to claim 1, wherein the flow channel has an essentially constant depth.

19. A front wall column construction of a motor vehicle, comprising:
   front wall column means adjacent a windshield of the vehicle,
   front wall column cover means covering an outside of the front wall column means and secured to the same,
   a water collecting channel means extending between the windshield and the front wall column cover means and including a flow channel adjacent the front wall column means for draining water from the water collecting channel means, the flow channel having a cross-section smaller than a cross-section of the water collecting channel means, the water collecting channel further including a deflection profile means abutting at the windshield for guiding water flowing laterally off from the windshield into the flow channel and for deflecting air flow over the flow channel to avoid water from being blown out of the flow channel, the deflection profile means tapers conically from a lower to an upper end of the water collecting channel means, and an insert profile means forming at least a portion of the water collecting channel means, the insert profile being constructed as a seal and abutting at the front wall column cover means.

20. A front wall column construction according to claim 1, wherein the flow channel extends over a windshield frame at an upper edge of the windshield to a roof paneling of the vehicle.

21. A front wall column construction according to claim 1, wherein the insert profile is made of an elastic material.

22. A front wall column construction according to claim 1, wherein the insert profile is made of a harder elastic material within the area of the flow channel then an elastic material within the area of the deflection profile.

23. A front wall column construction according to claim 1, wherein the deflection profile is vulcanized to the flow channel.

24. A front wall column construction according to claim 1, wherein the front wall column cover is jointedly fixed at the front wall column along its one longitudinal edge and is yieldingly supported at the insert profile with its other longitudinal edge.

25. A front wall column construction according to claim 1, wherein the front wall column cover is jointedly fixed at the front wall column with its one longitudinal edge and is elastically supported at a retaining strip secured at the front wall column within the area of its other longitudinal edge.

26. A front wall column construction according to claim 1, wherein a further water collecting channel is provided within an area of a longitudinal edge of the front wall column cover adjacent a side window of the vehicle.

* * * * *